(12) United States Patent
Darata et al.

(10) Patent No.: US 7,234,807 B2
(45) Date of Patent: Jun. 26, 2007

(54) FLEXIBLE AUXILIARY CLIP-ON FOR TENSION MOUNTING TO A MATING SPECTACLE FRAME

(76) Inventors: Ronald L. Darata, 14072 NW. 82nd Ave., Miami Lakes, FL (US) 33016; Clarence Chi Wah Kwok, Room 1201, Block A, King Ming Court, Junk Bay, N.T., Hong Kong (CN)

( * ) Notice: Subject to any disclaimer, the term of this patent is extended or adjusted under 35 U.S.C. 154(b) by 0 days.

(21) Appl. No.: 10/769,238

(22) Filed: Jan. 31, 2004

(65) Prior Publication Data

US 2005/0168683 A1    Aug. 4, 2005

(51) Int. Cl.
    *G02C 7/08*    (2006.01)
(52) U.S. Cl. ............... 351/57; 351/47; 351/44
(58) Field of Classification Search .......... 351/47, 351/48, 57, 58, 90, 41, 44
    See application file for complete search history.

(56) References Cited

U.S. PATENT DOCUMENTS

| | | | |
|---|---|---|---|
| 569,117 A | 10/1896 | Mosher | |
| 4,217,037 A * | 8/1980 | Lemelson | 351/44 |
| 5,416,537 A | 5/1995 | Sadler | |
| 5,568,207 A | 10/1996 | Chao | |
| 5,608,470 A | 3/1997 | Sheffield | |
| 5,614,963 A * | 3/1997 | Parker | 351/47 |
| 5,867,244 A * | 2/1999 | Martin | 351/47 |
| 5,943,114 A * | 8/1999 | Grendelmeier | 351/47 |
| 6,113,234 A | 9/2000 | Huang | |
| 6,116,730 A | 9/2000 | Kwok | |
| 6,234,627 B1 | 5/2001 | Agnoli | |
| 6,244,705 B1 | 6/2001 | Ledbetter et al. | |
| 6,260,964 B1 | 7/2001 | Kroman | |
| RE37,523 E | 1/2002 | Bondet | |
| RE37,545 E | 2/2002 | Chao | |
| 6,354,702 B2 | 3/2002 | Da Via' | |
| 6,354,703 B1 | 3/2002 | Sadler | |
| 6,364,478 B1 | 4/2002 | Jagasia | |
| 6,505,932 B2 * | 1/2003 | Xiao | 351/57 |
| 6,550,912 B2 | 4/2003 | Vitaloni | |
| 6,811,254 B2 * | 11/2004 | Ifergan | 351/57 |
| 2001/0021001 A1 * | 9/2001 | Lee | 351/57 |
| 2001/0046029 A1 | 11/2001 | Miele et al. | |
| 2003/0030770 A1 | 2/2003 | Strenk | |

* cited by examiner

*Primary Examiner*—Huy Mai
(74) *Attorney, Agent, or Firm*—Lambert & Associates; Gary E. Lambert

(57) ABSTRACT

A flexible auxiliary clip-on frame for tension mounting to a mating or primary spectacle frame. The clip on may be used to house sunglasses or any other frames necessary. The primary spectacle frame does not have to be constructed with any special features in order to mate with the auxiliary clip-on assembly. The primary spectacle frame assembly has the typical eyewear components including the eyerim, end pieces, rimblocks, bridge, temple, and optionally, nose pieces. Due to its flexible nature, the entire body of the auxiliary clip-on assembly acts as a spring. The spring-like qualities of the auxiliary clip-on assembly are used to securely fit the auxiliary clip-on assembly onto the primary spectacle frame assembly through the use of end piece retainers, without the need for magnets or any other fixture.

31 Claims, 4 Drawing Sheets

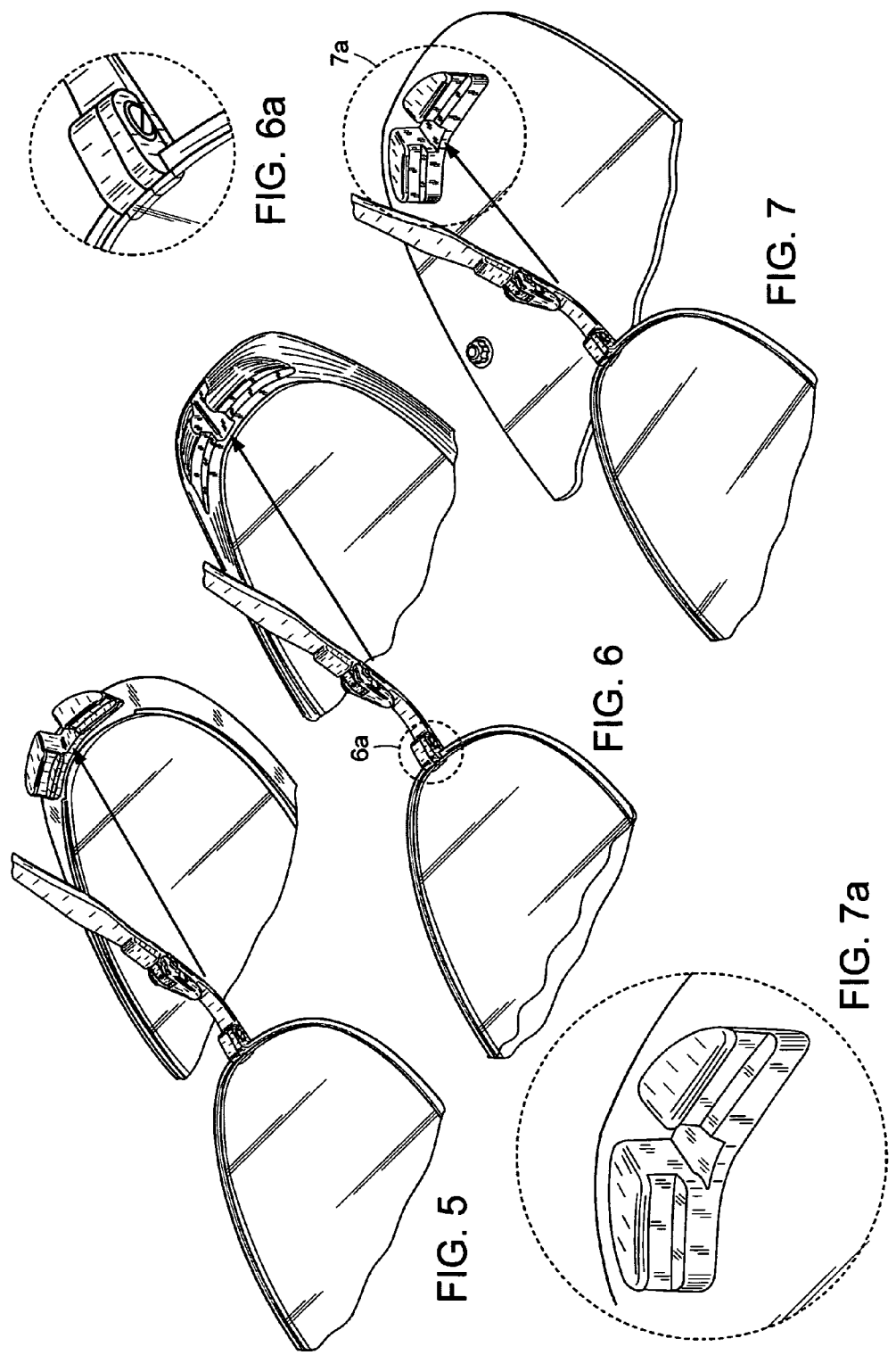

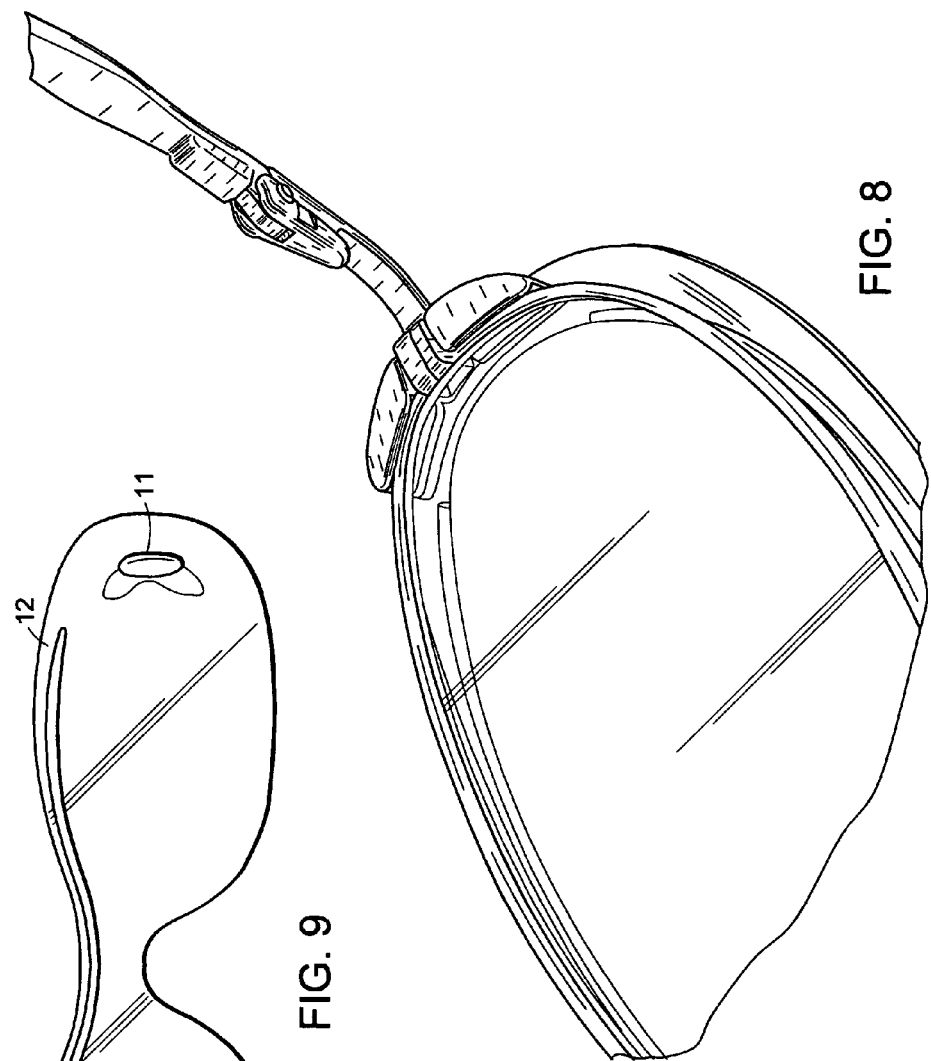
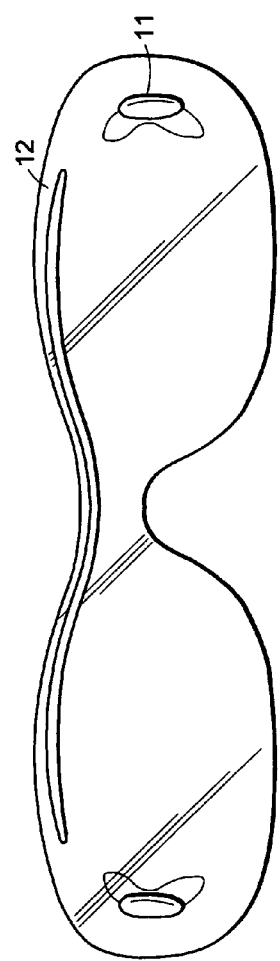

FLEXIBLE AUXILIARY CLIP-ON FOR TENSION MOUNTING TO A MATING SPECTACLE FRAME

FIELD OF THE INVENTION

The present invention relates generally to clip-on eyewear in which a primary lens holding assembly supports an auxiliary lens holding assembly, and in particular to a flexible auxiliary clip-on which is tension mounted to a mating spectacle frame.

BACKGROUND OF INVENTION

Clip-on eyewear, in one form or another, has been in use for over fifty years. The most common use is for a primary eyeglass frame, usually holding prescription lenses, to support an auxiliary eyeglass partial frame, usually holding sunglass lenses. One or both of the primary and auxiliary frames would be manufactured with structure to enable the user to mount the auxiliary partial frame onto the primary frame, so that the auxiliary (sunglass) lenses would be positioned in front of the primary (prescription) lenses. Many different configurations of clip-on eyewear have been designed. Clip-on sunglasses allow consumers to purchase a pair of sunglasses at an affordable price and enable prescription glasses to function as sunglasses by simply attaching the clip-on accessory.

Early embodiments of clip-on eyewear involving clip-on sunglasses were equipped with metal hooks or clamping mechanisms for attaching to prescription glasses. In order to attach the clip-on sunglasses to the prescription glasses, the clip-on was twisted and the metal hooks were affixed over the eyerim of the prescription glasses.

U.S. Pat. No. 569,117 issued to Mosher discloses a non-magnetic clip-on for attaching to a primary frame. However, the clips of the Mosher invention are constructed of metal. Further, the auxiliary clip-on of Mosher's invention employs a yielding ligament between the two lenses. And finally, the auxiliary clip-on of Mosher's invention is meant to put on or taken off while the primary frame is being worn.

A later embodiment of clip-on eyewear employed magnets to attach an auxiliary frame to a primary frame. By replacing the hooks with magnets, the clip-on sunglasses attached without twisting and hooking the clip-on. The magnets can be placed in a variety of positions. The initial magnetic embodiment involved front-mounted magnets. U.S. Pat. No. 5,416,537 issued to Sadler discloses a front-mounted magnetic eyewear invention. The subsequent magnetic embodiments moved the magnets to a variety of other locations such as top-mounted magnets, bridge-mounted magnets, back-mounted magnets, and bottom-mounted magnets.

U.S. Pat. No. 5,568,207 issued to Chao (reissued as Pat. No. RE37,545 E) discloses auxiliary lenses that magnetically engage with the primary eyeglass frame. In this disclosure, the configuration of the primary eyeglass frame and auxiliary lenses only prevent downward disengagement of the auxiliary lenses.

U.S. Pat. No. 6,116,730 issued to Kwok is an improvement on previous magnetic eyewear patents, such as U.S. Pat. No. 5,568,207 issued to Chao. In Kwok, the auxiliary lens frame securely attaches to the primary eyeglass frame whereby disengagement of the auxiliary lens frame from the primary eyeglass frame is prevented in all directions. The auxiliary lens frame is manufactured with engaging magnets contained on two sides projection members thereof in protective mounting collars, each having flanges that prevent the auxiliary lenses and primary eyeglass frame from becoming disengaged due to movement of the wearer when engaged.

This magnetic clip-on eyewear met the needs of consumers who had become more athletic and design-aesthetic conscious. The consumer's requirements for clip-on eyewear became more exacting as to the need for secure mounting and position-holding of the two assemblies, as well as the attractive appearance, using light weight metals with thin profiles.

However, despite their advantages over the metal hook variety, the magnetic attaching sunglasses had certain flaws as well. First, there are concerns regarding a pair of magnets emitting electromagnetic radiation on each side of the head for prolonged periods of time. There is no research yet that proves that this proximity for long durations of time is harmless. Second, there is the possibility of increased risk due to electromagnetic radiation directly next to cellular telephones. Third, there is the possibility that the magnets may be harmful to the cell phones. The impacts of magnets are still the subject of many studies.

Electromagnetic radiation cannot be shielded completely. Children are more vulnerable than adults to electromagnetic radiation. Cell phones have been linked to cancer. Electromagnetic radiation depletes lymphocytes that are part of the immune system. Power line electromagnetic radiation has been proven to cause leukemia. To date, exactly how much exposure to electromagnetic radiation can be harmful to health remains an unsolved scientific and medical issue.

Further, there is the possibility of issues associated with the magnets themselves. The magnets may fall out of the eyewear. The magnets may corrode. The magnets may corrode inherently; however, the movement of the magnets in some inventions may cause increased wear. For example, U.S. Pat. No. 5,568,207 issued to Chao only restricts downward disengagement versus U.S. Pat. No. 6,116,730 issued to Kwok which further restricts movement due to the presence of flanges on the auxiliary lens frame. In addition, when the magnets of the clip-on or frame are in a bag, such as a purse, stray objects such as paper clips are attracted to the eyewear. These situations cause either inconvenience, damaging scratches to lenses, and/or cost to consumers.

In addition, prior art clip-on eyewear is capable of one handed mounting and removal of the auxiliary assembly to and from the primary assembly, when the primary assembly is being worn but such action causes that one hand to be put in front of one's eyes, often when driving a car or descending stairs—which poses a safety problem.

U.S. Pat. No. 5,608,470 issued to Sheffield discloses a prescription lens attachable to safety glasses. The safety glasses are equipped with a projecting rim. The prescription lens is constructed with a sloping edge to fit into the projecting rim of the safety glasses. The prescription lens fits in the inside of the safety glasses between the wearer's face and the safety glasses. This invention is quite different from other clip-on eyewear inventions due to the fact that attachment occurs on the inside of the primary frame rather than the outside. A distinct disadvantage of this invention is that both the safety glasses and the prescription lenses must be specially constructed with either a projecting rim or the appropriate sloping edge in order for engagement to occur.

U.S. Pat. No. 6,113,234 issued to Huang discloses a non-magnetic clip-on for attaching to a primary frame. In Huang, both the primary frame and the auxiliary frame require special modification to effectuate engagement. The primary frame is constructed with recessed notches, while the auxiliary frame is constructed with hooks. The alignment of the hooks and notches is critical to engagement.

U.S. Pat. No. 6,234,627 issued to Agnoli also discloses a non-magnetic clip-on eyewear invention. Specifically, Agnoli discloses an eyeglass device with a removable supplemental lens. In Agnoli, the primary frame must be manufactured with tabbed projections to meet with the notches of the auxiliary frame in order for attachment to occur.

U.S. Pat. No. 6,244,705 issued to Ledbetter discloses auxiliary corrective eyeglasses for use with primary eyeglasses. In Ledbetter, there is no clipping, attachment, or engagement involved. In Ledbetter, the auxiliary frame merely rests on the inside of the primary frame. There are clear disadvantages to this invention that fails to provide a secure means for maintaining the auxiliary frame in its proper, desired position.

U.S. Pat. No. 6,260,964 issued to Kroman discloses a non-magnetic clip-on eyewear invention. The auxiliary frame in Kroman slides into position in front of the primary frame. Both the primary frame and auxiliary frame must be constructed with curved portions for attachment to occur.

Utility Pat. No. RE37,523 issued to Bondet discloses eyeglasses having interchangeable lenses and attachment clips in contrast to clip-on eyewear which involves a separate auxiliary and primary frame. There are many disadvantages associated with this type of invention including but not limited to ease of use.

U.S. Pat. No. 6,354,703 issued to Sadler discloses a magnetic clip-on eyewear invention. In particular, Sadler discloses eyeglass devices having auxiliary eyeglasses with magnetic clamp mounting. The numerous potential disadvantages associated with magnetic clip-on eyewear have been discussed above. There are further disadvantages associated with the Sadler invention due to the fact that the magnetic features of the invention are a separate entity from the auxiliary and primary frames and thus could become more easily lost or damaged.

U.S. Pat. No. 6,364,478 issued to Jagasia discloses an eyeglass device having primary and auxiliary frames with lenses and method for forming the same. As Jagasia is a clip-on magnetic eyewear invention, it too is subject to the numerous potential disadvantages associated with magnetic clip-on eyewear discussed above.

U.S. Pat. No. 6,550,912 issued to Vitaloni discloses spectacles with additional removable lens or lenses. This non-magnetic clip-on eyewear invention requires that the primary frame be manufactured with means for clasping the auxiliary lenses.

For these reasons, a biologically safe clip-on is needed which attaches with neither metal hooks nor magnets.

SUMMARY OF THE INVENTION

The present invention entails the next generation of clip-on technology. The present invention is a clip-on product that does not employ magnets. In the present invention, the auxiliary clip-on assembly is constructed of a flexible material. The auxiliary clip-on assembly includes the auxiliary clip-on lens and two end piece retainers. The end piece retainers are constructed of a material such as plastic or other suitable material and may be affixed to the auxiliary clip-on assembly by a variety of methods including, but not limited to, screws, glue, welding, or other suitable means. The primary spectacle frame assembly does not have to be constructed with any special features in order to mate with the auxiliary clip-on assembly. The primary spectacle frame assembly has the typical eyewear components including the eyerim, end pieces, rimblocks, bridge, temple, and optionally, nose pieces. Due to its flexible nature, the entire body of the auxiliary clip-on assembly acts as a spring. The spring-like qualities of the auxiliary clip-on assembly are used to securely fit the auxiliary clip-on assembly onto the primary spectacle frame assembly. The placement and removal of the auxiliary clip-on assembly is best accomplished with two hands to avoid any safety problems.

These and other features, aspects and advantages of the present invention will become better understood with reference to the following description, claims, and accompanying drawings. Therefore, the form of the invention, as set out above, should be considered illustrative and not as limiting the scope of the following claims.

BRIEF DESCRIPTION OF DRAWINGS

FIG. 5 is an isometric view looking forward at the rear of the primary spectacle frame assembly in the process of mating with one embodiment of the auxiliary clip-on assembly.

FIG. 6 is an isometric view looking forward at the rear of the primary spectacle frame assembly in the process of mating with one embodiment of the auxiliary clip-on assembly.

FIG. 6a is an exploded side view depicting the rimblock in the closed position.

FIG. 7 is an isometric view looking forward at the rear of the primary spectacle frame assembly in the process of mating with one embodiment of the auxiliary clip-on assembly.

FIG. 7a is an exploded isometric view looking forward at the rear of an end piece retainer as mounted to the rear side of the auxiliary frame.

FIG. 8 is an isometric view looking forward at the rear of the primary spectacle frame assembly completely mating with one embodiment of the auxiliary clip-on assembly.

FIG. 9 is a front elevational view depicting a single member auxiliary clip-on assembly possessing a front vertical surface and a rear vertical surface, a first and a second end piece retainer, wherein said first and second end piece retainers are mounted on said rear surface of said a single member auxiliary clip-on assembly and said first and second end piece retainers are mounted on said rear surface of said single member lens and said first and second end piece retainers couple with said lens.

DESCRIPTION OF THE INVENTION

The preferred embodiment of the present invention represents a flexible auxiliary frame for mating with a primary frame as shown in FIGS. 1-9.

Figure 1:
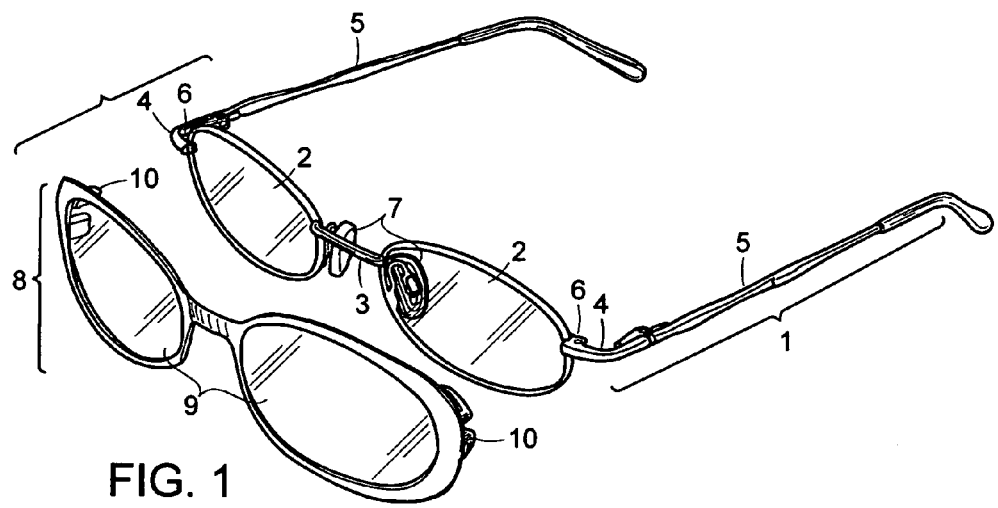
FIG. 1 is an isometric view of the primary spectacle frame assembly and the auxiliary clip-on assembly before mating.

With reference to FIG. 1, FIG. 1 depicts the primary spectacle frame assembly 1 of the present invention. The primary spectacle frame assembly 1 can be constructed of plastic, metal, or other material suitable for the purpose. The primary spectacle frame assembly 1 contains the eyerim 2, the bridge 3, the end pieces 4, the temples 5, and the rimblocks 6. Optionally, the primary spectacle frame assembly 1 can also include nose pieces 7. The rimblocks 6 are an essential element of the primary spectacle frame assembly 1. The rimblocks 6 allow the eyerim 2 to be opened for insertion and/or replacement of the lenses of the primary spectacle frame assembly 1. The lenses of the primary spectacle frame assembly 1 may be clear lenses, may be prescription lenses, or may be other lenses suitable for the purpose such as tinted lenses.

Further, with reference to FIG. 1, FIG. 1 also depicts the auxiliary clip-on assembly 8 of the present invention. The auxiliary clip-on assembly 8 will be constructed of a flexible material. The auxiliary clip-on assembly 8 is curved in an arc in its horizontal plane with its two opposing outer temporal sides curved rearward. The auxiliary clip-on assembly 8 contains the auxiliary clip-on lens(es) 9 and the end piece retainers 10. The auxiliary clip-on lens(es) 9 of the auxiliary clip-on assembly 8 may be tinted lenses such as sunglasses, may be prescription lenses, may be safety lenses, or may be other lenses suitable for the purpose. The auxiliary clip-on lens(es) 9 of the auxiliary clip-on assembly 8 can be constructed of a single piece or can be constructed of two separate lenses attached by a plastic frame, metal frame, or other material suitable for the purpose. The auxiliary clip-on assembly 8 can be the same size and shape of the primary spectacle frame assembly 1, or can be a different shape than the primary spectacle frame assembly 1. Notwithstanding the shape of the auxiliary clip-on assembly 8, the distance between its end piece retainers 10 and their vertical/horizontal location on the rear of the auxiliary clip-on assembly 8 will be of dimensions that match the corresponding end piece 4 and eyerim 2 dimensions of the primary spectacle frame assembly 1. The end piece retainers 10 of the auxiliary clip-on assembly 8 are the attaching means used to affix the auxiliary clip-on assembly 8 to the primary spectacle frame assembly 1.

In further reference to FIG. 1, the end piece retainers 10 are located near the outer temporal sides of the auxiliary clip-on assembly 8 for engagement with and attachment to the end pieces 4 and eyerims 2 of the primary spectacle frame assembly 1. The end piece retainers 10 are affixed to the rear vertical surface of the auxiliary clip-on assembly 8. The end piece retainers 10 may be affixed using a variety of methods such as screws, glue, welding, molding into the auxiliary clip-on assembly 8, or other suitable means. The end piece retainers 10 are located on the rear vertical surface of the auxiliary clip-on lens 9 in a position whereby the grooves in the end piece retainers 10 line up with the end pieces 4 of the primary spectacle frame assembly 1.

Figure 2:
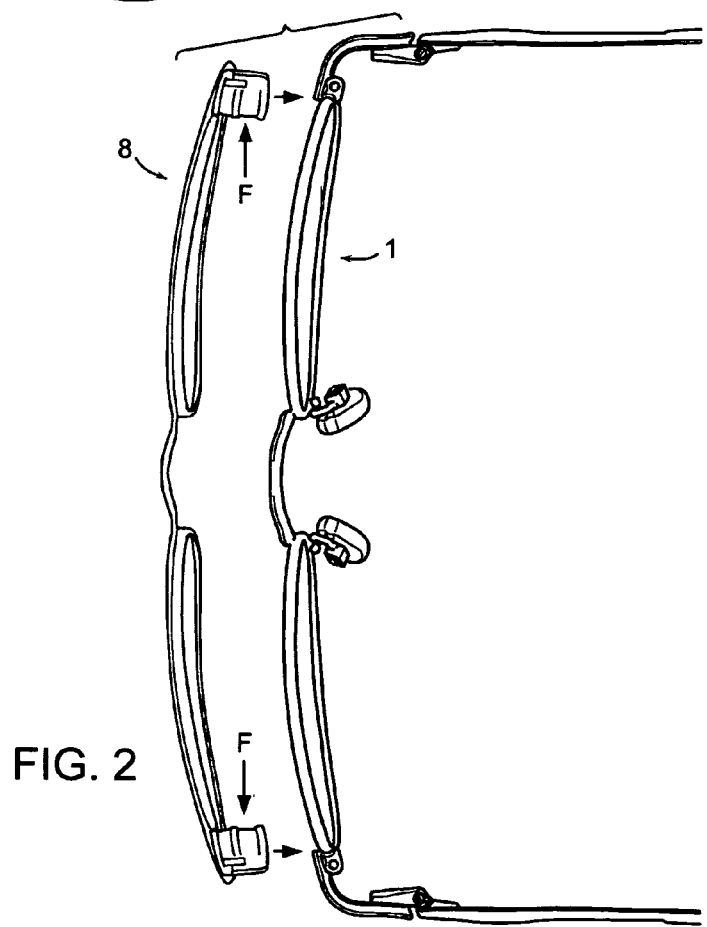
FIG. 2 is a top plan view of the primary spectacle frame assembly and auxiliary clip-on assembly before mating, also illustrating the forces applied in the process of mating.

With reference to FIG. 2, FIG. 2 depicts the flex action of the auxiliary clip-on assembly 8 that is utilized to place the auxiliary clip-on assembly 8 onto the primary spectacle frame assembly 1. First, the end pieces 4 and eyerim 2 sides of the primary spectacle frame assembly 1 are lined up with the grooves in the corresponding end piece retainers 10 of the auxiliary clip-on assembly 8. Next, a slight pressure is applied to the middle of the auxiliary clip-on assembly 8. Due to the flexible nature of the auxiliary clip-on assembly 8, this pressure creates movement at the two edges of the auxiliary clip-on assembly 8. This movement increases the distance between the end piece retainers 10 of the auxiliary clip-on assembly 8. The distance between the end piece retainers 10 of the auxiliary clip-on assembly 8 is now larger than the distance from the side of the left eyerim 2 of the primary spectacle frame assembly 1 to the side of the right eyerim 2 of the primary spectacle frame assembly 1. This increase in distance of the end piece retainers 10 of the auxiliary clip-on assembly 8 allows the end piece retainers 10 to snap onto the end pieces 4 and eyerims 2 of the primary spectacle frame assembly 1. Once the pressure that was applied to the middle of the auxiliary clip-on assembly 8 is released, the distance between the end piece retainers 10 returns to is starting position. This decrease in distance between the end piece retainers 10 of the auxiliary clip-on assembly 8 causes the end piece retainers 10 to touch and grip the sides of the eyerims 2 of the primary spectacle frame assembly 1 such that the auxiliary clip-on assembly 8 remains securely attached to the primary spectacle frame assembly 1. This gripping effect is achieved as a result of the natural tension of the auxiliary clip-on assembly 8.

Figure 3:
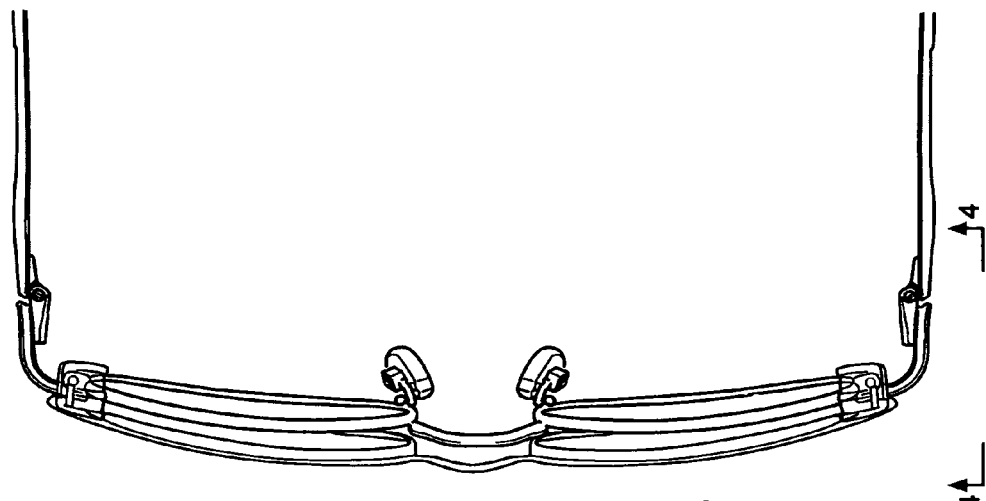
FIG. 3 is a top plan view of the mated primary spectacle frame assembly and auxiliary clip-on assembly.

With reference to FIG. 3, FIG. 3 depicts the mated primary spectacle frame assembly 1 and auxiliary clip-on assembly 8.

Figure 4:
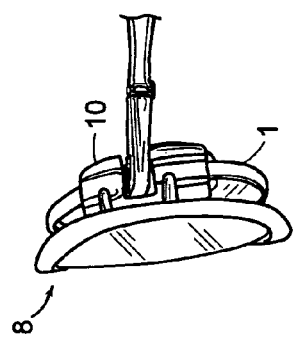
FIG. 4 is a side elevation view of the auxiliary clip-on assembly mated with the primary spectacle frame assembly.

With reference to FIG. 4, FIG. 4 depicts a close up of the mated primary spectacle frame assembly 1 and auxiliary clip-on assembly 8.

With reference to FIG. 5, FIG. 5 depicts a partial view of the attachment the primary spectacle frame assembly 1 and one embodiment of the auxiliary clip-on assembly 8, the auxiliary clip-on assembly 8 equipped with a metal auxiliary clip-on frame.

With reference to FIG. 6, FIG. 6 depicts a partial view of the attachment the primary spectacle frame assembly 1 and one embodiment of the auxiliary clip-on assembly 8, the auxiliary clip-on assembly 8 equipped with a plastic auxiliary clip-on frame.

With reference to FIG. 6a, FIG. 6a is an exploded side view depicting the rimblock 6 in the closed position.

With reference to FIG. 7, FIG. 7 depicts a partial view of the attachment the primary spectacle frame assembly 1 and one embodiment of the auxiliary clip-on assembly 8, the auxiliary clip-on assembly 8 with a single auxiliary clip-on lens 9 and no auxiliary clip-on frame.

With reference to FIG. 7a, FIG. 7a is an isometric view looking forward at the rear of an end piece retainer as mounted to the rear side of the auxiliary frame.

With reference to FIG. 8, FIG. 8 depicts a close up of the mated primary spectacle frame assembly 1 and auxiliary clip-on assembly 8.

The clip-on embodiments disclosed and illustrated for this invention incorporate a safer method for use than the prior art, in that two hands are required to more easily mount the auxiliary clip-on assembly 8 onto and remove it from the primary spectacle frame assembly 1 while the primary spectacle frame assembly 1 is not on the wearer's face. Thus, this method eliminates the safety issues involved with one-handed or even two-handed mounting while the primary spectacle frame assembly 1 is being worn, since in these methods, at least one hand is positioned in front of the wearer's eyes.

The adaptability of the instant design to multiple different embodiments allows for multiple auxiliary clip-on designs which can be mated with the same primary frame. As shown in FIGS. 5-7 discussed above, auxiliary frames possessing differing shapes and sizes of eyerim may be utilized. Further, auxiliary frames with no eyerims and only lenses may also be adapted to the instant invention.

With reference to FIG. 9, FIG. 9 depicts a single member auxiliary clip-on assembly 8 possessing a front vertical surface and a rear vertical surface, a first and a second end piece retainer 10, a plurality of fasteners 11 wherein said plurality of end piece retainers 10 are mounted on said rear surface of said a single member auxiliary clip-on assembly 8 and said a plurality of fasteners 11 are mounted on said rear surface of said single member lens and said fasteners couple with said lens. Also, the auxiliary clip-on assembly may possess a torsion bar 12 mounted on said front vertical surface of said single member lens 8 and can be mounted by glue, welding, brazing or screws. The single member lens 8 can also be polarized.

What is claimed is:

1. A primary spectacle frame and corresponding auxiliary clip-on spectacle frame system assembly comprising:
    a primary spectacle frame:
        a first eyerim for containing a first primary spectacle frame lense, wherein said first eyerim further comprises an outer side and an inner side;
        a second eyerim for containing a second primary spectacle frame lense, wherein said second eyerim further comprises an outer side and an inner side;
        a bridge attached to and connecting said inner sides of said first eyerim and said second eyerim;
        a first nose piece attached to said inner side of said first eyerim below said bridge on a rear side of said primary spectacle frame;
        a second nose piece attached to said inner side of said first eyerim below said bridge on a rear side of said primary spectacle frame;
        a first end piece attached to said outer side of said first eyerim at a first end of said first end piece, wherein said first end piece extends from said outer side of said first eyerim;
        a second end piece attached to said outer side of said second eyerim at a first end of said second end piece, wherein said second end piece extends from said outer side of said second eyerim;
        a first rimblock attached to said outer side of said first eyerim at a first end of said first rimblock, wherein said first rimblock contains means for allowing said first eyerim to be opened and closed for insertion and/or replacement of said first primary spectacle frame lense, wherein said attachment of said first rimblock to said first eyerim is proximate to said attachment of said first end of said first end piece to said outer side of said first eyerim, wherein said first rimblock extends from said outer side of said first eyerim, further wherein said first rimblock extends in a parallel direction as said first end piece extends; wherein said first rimblock is connected to said first end piece on said rear side of said primary spectacle frame;
        a second rimblock attached to said outer side of said second eyerim at a first end of said second rimblock, wherein said second rimblock contains means for allowing said second eyerim to be opened and closed for insertion and/or replacement of said second primary spectacle frame lense, wherein said attachment of said second rimblock to said second eyerim is proximate to said attachment of said first end of said second end piece to said outer side of said second eyerim, wherein said second rimblock extends from said outer side of said second eyerim, further wherein said second rimblock extends in a parallel direction as said second end piece extends; wherein said second rimblock is connected to said first end piece on said rear side of said primary spectacle frame;
        a first temple attached to and extending from a second end of said first end piece;
        a second temple attached to and extending from a second end of said second end piece; and,
    an auxiliary clip-on spectacle frame comprising:
        a first auxiliary eyerim for containing a first auxiliary spectacle lense, wherein said first auxiliary eyerim further comprises an outer side and an inner side;
        a second auxiliary eyerim for containing a second auxiliary spectacle lense, wherein said second auxiliary eyerim further comprises an outer side and an inner side;
        an auxiliary bridge attached to and connecting said inner sides of said first auxiliary eyerim and said second auxiliary eyerim, wherein a collective unit of said first auxiliary eyerim, said bridge and said second auxiliary eyerim, possesses a rearwardly concave arcuate shape;
        a first end piece retainer attached to said outer side of said first auxiliary eyerim on a rear side extending rearwardly, wherein said first end piece retainer possesses a rearwardly concave arcuate shape, further wherein said first end piece retainer contains a horizontal disposed channel with a width that is substantially the same as the vertical width of said first end piece, further wherein said first end piece retainer also contains a vertical disposed channel with a width that is substantially the same as the width of the first eyerim;
        a second end piece retainer attached to said outer side of said second auxiliary eyerim on said rear side extending rearwardly, wherein said second end piece retainer possesses a rearwardly concave arcuate shape, further wherein said second end piece retainer contains a horizontal disposed channel with a width that is substantially the same as the vertical width of said second end piece, further wherein said second end piece retainer also contains a vertical disposed channel with a width that is substantially the same as the width of the second eyerim;
        wherein the distance between a first end of said first end piece retainer and a first end of said second end piece retainer substantially matches the distance of said first end of said first end piece and said first end of said second end piece;
        wherein said horizontal disposed channel of said first end piece retainer engages said first end piece and stably restrains said first end piece retainer in a horizontal plane;
        wherein said horizontal disposed channel of said second end piece retainer engages said second end piece and stably restrains said second end piece retainer in a horizontal plane,
        further wherein said vertically disposed channel of said first end piece retainer engages said outer side of said first eyerim and stably restrains said first end piece retainer in a vertical plane;
        further wherein said vertically disposed channel of said second end piece retainer engages said outer side of said second eyerim and stably restrains said second end piece retainer in a vertical plane;
        wherein said connection of said first eyerim, said bridge and said second eyerim is fabricated from a rigid material so that said connection of said first eyerim, said bridge and said second eyerim may not be deformed and remains rigid upon engagement; and,
        wherein said connection, said first auxiliary eyerim, said auxiliary bridge and said second auxiliary eyerim is fabricated from a resiliently compliant material wherein said auxiliary clip-on assembly is disposed to be deformable to allow flexure upon engagement.

2. The primary spectacle frame and corresponding auxiliary clip-on spectacle frame system assembly of claim 1 wherein said first and second eyerim are constructed of plastic.

3. The primary spectacle frame and corresponding auxiliary clip-on spectacle frame system assembly of claim 1 wherein said first and second eyerim are constructed of metal.

4. The primary spectacle frame and corresponding auxiliary clip-on spectacle frame system assembly of claim 1 wherein said first and second primary spectacle frame lenses are constructed of transparent material.

5. The primary spectacle frame and corresponding auxiliary clip-on spectacle frame system assembly of claim 1 wherein said first and second primary spectacle frame lenses are prescription lenses.

6. The primary spectacle frame and corresponding auxiliary clip-on spectacle frame system assembly of claim 1 wherein said first and second primary spectacle frame lenses constructed of a tinted material.

7. The primary spectacle frame and corresponding auxiliary clip-on spectacle frame system assembly of claim 1 wherein said first and second auxiliary spectacle lenses are constructed of a tinted material.

8. The primary spectacle frame and corresponding auxiliary clip-on spectacle frame system assembly of claim 1 wherein said first and second auxiliary spectacle lenses are prescription lenses.

9. The primary spectacle frame and corresponding auxiliary clip-on spectacle frame system assembly of claim 1 Wherein said first and second auxiliary spectacle lenses are safety lenses.

10. The primary spectacle frame and corresponding auxiliary clip-on spectacle frame system assembly of claim 1 wherein said first and second end piece retainers are constructed of plastic.

11. The primary spectacle frame and corresponding auxiliary clip-on spectacle frame system assembly of claim 1 wherein said auxiliary clip-on spectacle frame is constructed of plastic.

12. The primary spectacle frame and corresponding auxiliary clip-on spectacle frame system assembly of claim 1 wherein said auxiliary clip-on spectacle frame is constructed of metal.

13. The primary spectacle frame and corresponding auxiliary clip-on spectacle frame system assembly of claim 1 wherein said auxiliary clip-on spectacle frame is substantially identical in size to a said primary spectacle frame.

14. The primary spectacle frame and corresponding auxiliary clip-on spectacle frame system assembly of claim 1 wherein said auxiliary clip-on spectacle frame is substantially identical in shape to said primary spectacle frame.

15. The primary spectacle frame and corresponding auxiliary clip-on spectacle frame system assembly of claim 1 wherein said auxiliary clip-on spectacle frame is of a differing size than said primary spectacle frame.

16. The primary spectacle frame and corresponding auxiliary clip-on spectacle frame system assembly of claim 1 wherein said auxiliary clip-on spectacle frame is of a differing shape than said primary spectacle frame.

17. The primary spectacle frame and corresponding auxiliary clip-on spectacle frame system assembly of claim 1 wherein said auxiliary clip-on spectacle frame is substantially identical in shape and size to said primary spectacle frame.

18. The primary spectacle frame and corresponding auxiliary clip-on spectacle frame system assembly of claim 1 wherein said auxiliary clip-on spectacle frame is of a differing shape and size than said primary spectacle frame.

19. The primary spectacle frame and corresponding auxiliary clip-on spectacle frame system assembly of claim 1 wherein said auxiliary clip-on spectacle frame possesses a torsion bar.

20. The primary spectacle frame and corresponding auxiliary clip-on spectacle frame system assembly of claim 1 wherein said torsion bar is located on the front of said auxiliary clip-on spectacle frame.

21. The primary spectacle frame and corresponding auxiliary clip-on spectacle frame system assembly of claim 1 wherein said auxiliary clip-on spectacle frame does not contact said primary spectacle frame except at the engaging surfaces of said end piece retainers.

22. The primary spectacle frame and corresponding auxiliary clip-on spectacle frame system assembly of claim 1 wherein said primary spectacle frame contains ophthalmic lens and said auxiliary clip-on spectacle frame contains tinted lenses.

23. The primary spectacle frame and corresponding auxiliary clip-on spectacle frame system assembly of claim 1 wherein said primary spectacle frame contains ophthalmic lens and said auxiliary clip-on spectacle frame contains sunglass lenses.

24. The primary spectacle frame and corresponding auxiliary clip-on spectacle frame system assembly of claim 1 wherein said first and said second end piece retainers are transparent.

25. An auxiliary clip-on assembly comprising:
a single member lens possessing a front vertical surface and a rear vertical surface;
a plurality of end piece retainers;
a plurality of fasteners wherein said plurality of end piece retainers are mounted on said rear surface of said single member lens and said fasteners are mounted on said front surface of said single member lens and wherein said fasteners couple said end piece retainers to said lens by penetrating said lens; and
a torsion bar.

26. The auxiliary clip-on assembly of claim 25 wherein said torsion bar is mounted on said front vertical surface of said single member lens.

27. The auxiliary clip-on assembly of claim 26 wherein said torsion bar is mounted on said front vertical surface of said single member lens by glue.

28. The auxiliary clip-on assembly of claim 26 wherein said torsion bar is mounted on said front vertical surface of said single member lens by welding.

29. The auxiliary clip-on assembly of claim 26 wherein said torsion bar is mounted on said front vertical surface of said single member lens by brazing.

30. The auxiliary clip-on assembly of claim 26 wherein said torsion bar is mounted on said front vertical surface of said single member lens by screws.

31. The auxiliary clip-on assembly of claim 25 wherein said a single member lens is polarized.

* * * * *